(12) United States Patent
Perrault et al.

(10) Patent No.: US 10,603,724 B2
(45) Date of Patent: *Mar. 31, 2020

(54) CARTESIAN PIPE FACER

(71) Applicant: McElroy Manufacturing, Inc., Tulsa, OK (US)

(72) Inventors: James R. Perrault, Tulsa, OK (US); Seth P. Ahrens, Tulsa, OK (US); Abraham B. Contreras, Jenks, OK (US); William Barton Draeger, Tulsa, OK (US); Fabiano Tavares de Souza, Houston, TX (US)

(73) Assignee: McElroy Manufacturing, Inc.

( * ) Notice: Subject to any disclaimer, the term of this patent is extended or adjusted under 35 U.S.C. 154(b) by 37 days.

This patent is subject to a terminal disclaimer.

(21) Appl. No.: 15/470,250

(22) Filed: Mar. 27, 2017

(65) Prior Publication Data

US 2017/0197255 A1    Jul. 13, 2017

Related U.S. Application Data

(63) Continuation of application No. 14/029,666, filed on Sep. 17, 2013, now Pat. No. 9,604,288.

(51) Int. Cl.
| | |
|---|---|
| *B23C 3/12* | (2006.01) |
| *B23C 3/00* | (2006.01) |
| *B29C 65/00* | (2006.01) |
| *B29C 65/02* | (2006.01) |
| *B29C 69/00* | (2006.01) |
| *B29L 23/00* | (2006.01) |

(52) U.S. Cl.
CPC ............. *B23C 3/122* (2013.01); *B23C 3/007* (2013.01); *B29C 65/02* (2013.01); *B29C 66/02241* (2013.01); *B29C 66/1142* (2013.01); *B29C 66/5221* (2013.01); *B29C 66/71* (2013.01); *B29C 69/001* (2013.01); *B23C 2226/61* (2013.01); *B29L 2023/22* (2013.01); *Y10T 409/308288* (2015.01)

(58) Field of Classification Search
CPC ..... B23C 3/007; B23C 3/122; B23C 2226/61; Y10T 409/300504; Y10T 409/304144; Y10T 409/307168; Y10T 409/307784; Y10T 409/308288; Y10T 409/308568
USPC ................. 409/73, 138, 192, 203, 212, 217
See application file for complete search history.

(56) References Cited

U.S. PATENT DOCUMENTS

| | | | |
|---|---|---|---|
| 1,878,707 A | 9/1932 | Johnson | |
| 1,933,575 A | 11/1933 | Woytych | |
| 1,937,408 A | 11/1933 | Johnson | |
| 2,690,703 A | 10/1954 | Creek | |
| 5,090,851 A | 2/1992 | White | |

FOREIGN PATENT DOCUMENTS

| | | |
|---|---|---|
| CN | 102615322 A | 8/2012 |
| EP | 0453747 | 10/1991 |
| EP | 0528052 | 2/1993 |

*Primary Examiner* — Alan Snyder
(74) *Attorney, Agent, or Firm* — Frank J. Catalano; Gable & Gotwals

(57) ABSTRACT

A facer for use in preparing the opposed ends of polyolefin pipes for fusion into a pipeline has a pair of cutting wheels which rotate in unison. A controller causes the cutting wheels to trace and face the pipe end walls in a closed loop path.

2 Claims, 12 Drawing Sheets

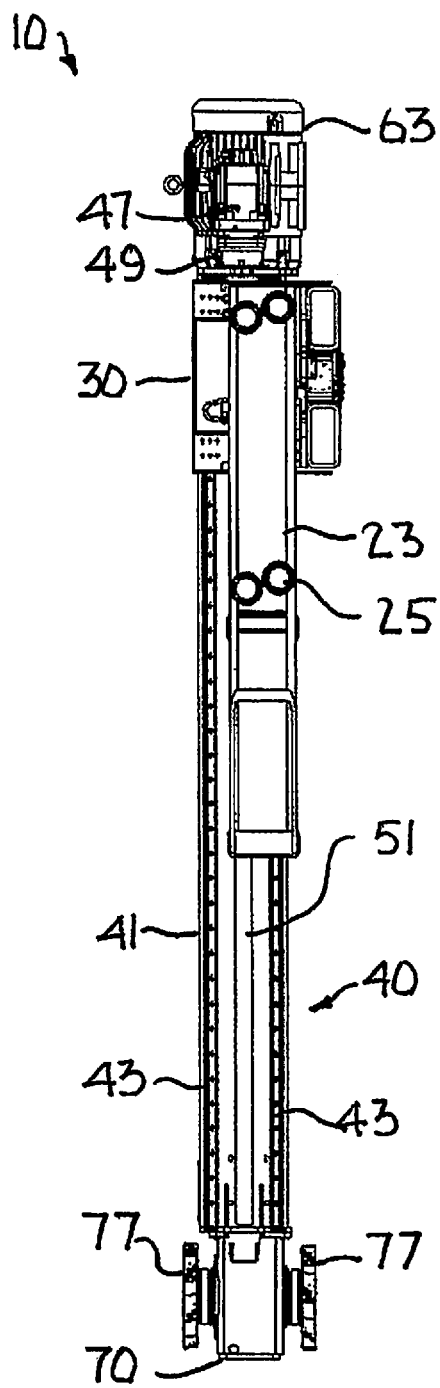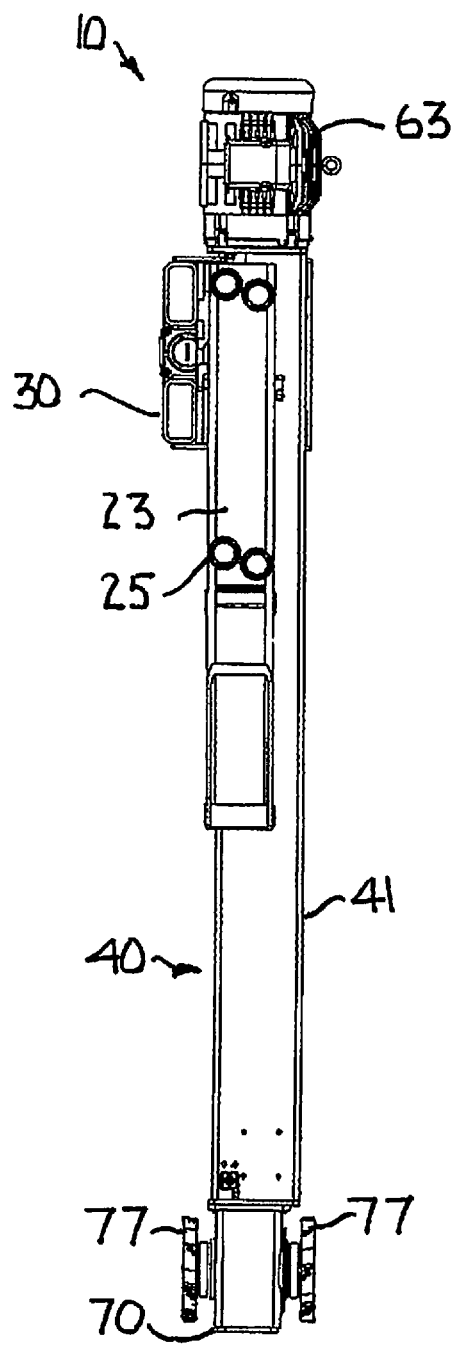
Fig. 4
Fig. 5

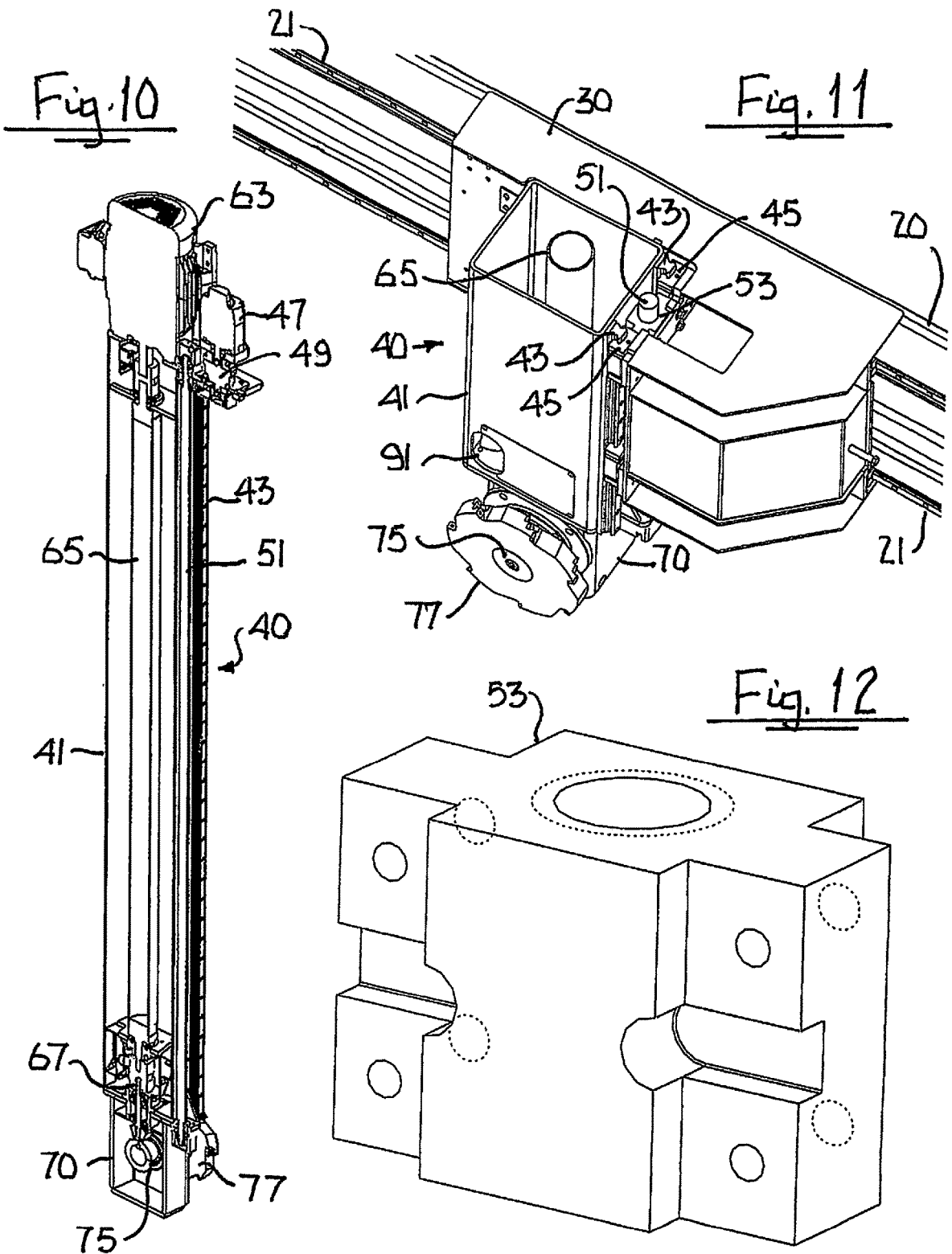

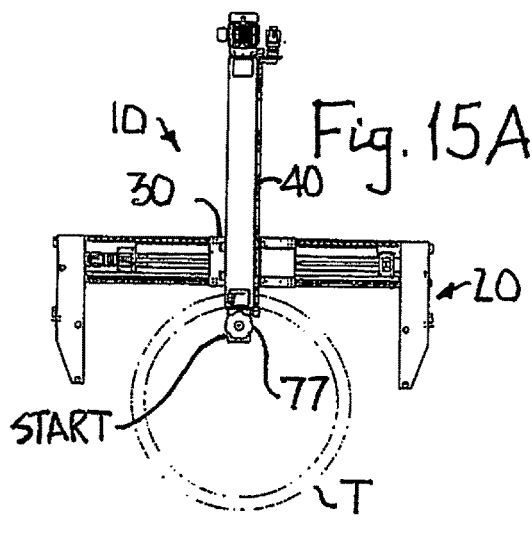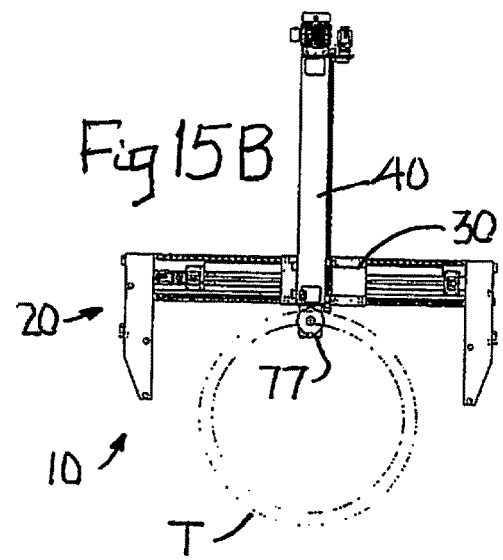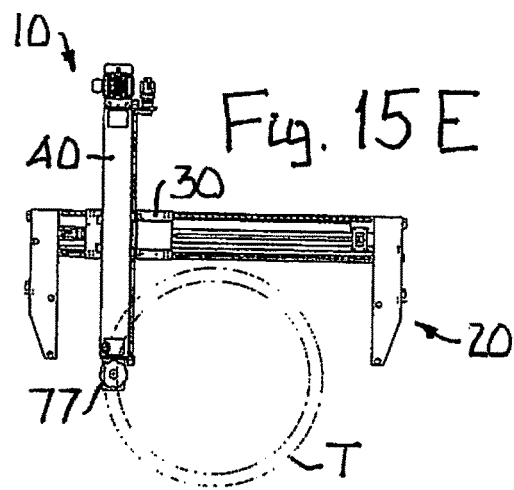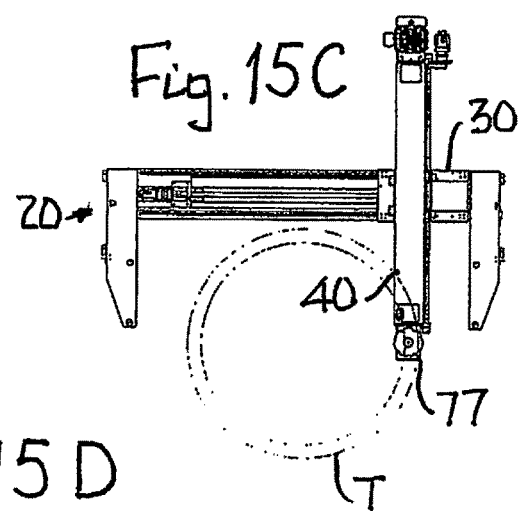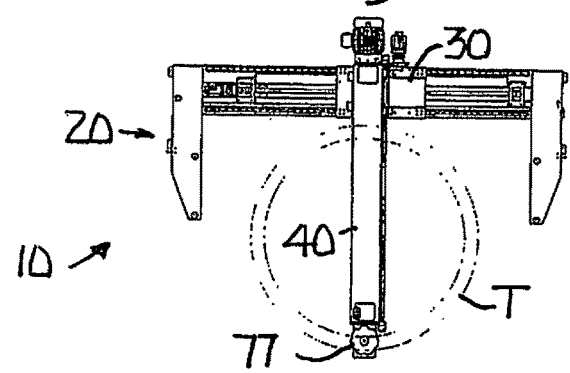

CARTESIAN PIPE FACER

CROSS-REFERENCE TO PENDING APPLICATIONS

This application is a continuation of U.S. patent application Ser. No. 14/029,666, filed Sep. 17, 2013.

BACKGROUND OF INVENTION

This invention relates generally to fusion of polyolefin pipes and more particularly concerns facers used to prepare pipe ends for the fusion process.

Present facer technology provides hydraulic or electric rotating planar block facers and single point cutting tools. Known block facers typically carry one to six blades on opposite faces of the planar block. As they rotate they slowly remove shavings from the pipes to create parallel faces of the pipes to be joined, usually but not always in a plane the perpendicular to the longitudinal axis of the pipes. Typically, the shavings are 0.010" to 0.030" thick and continuous along the pipe circumference. They pose significant clean up and disposal problems.

The cutting speed of these facers is limited by the diameter of the block. The greater their diameter, the less 360° cut rotations they can make per minute. It is quite common that one inch of pipe length will be removed during the facing process. At 0.010" to 0.030" per rotation, facing time can be quite lengthy. This is of particular concern in pipe fusion applications because pipe heating and fusion times are generally held within established standards. Therefore, progress in fusion efficiency is substantially limited to reduction of handling or facing times.

Non-matching ovalities of the pipes to be joined make efficient achievement of matching surfaces very difficult for block facers. Known single point cutting tools simply do not consistently provide cut finished surfaces suitable for pipe fusion standards.

It is, therefore, an object of this invention to provide a pipe facer that can operate at higher cutting speeds than known pipe facers. It is also an object of this invention to provide a pipe facer that is more likely to properly face pipes having non-matching ovalities than known pipe facers. A further object of this invention is to provide a pipe facer that affords greater time efficiency and quality consistency than known pipe facers. Another object of this invention is to provide a pipe facer that converts removed pipe material into a form easier to collect and dispose of than known pipe facers.

SUMMARY OF INVENTION

In accordance with the invention, a facer for use in preparing the opposed ends of polyolefin pipes for fusion into a pipeline has a frame, a sled mounted on the frame and responsive to a first servo motor, a boom mounted on the sled and responsive to a second servo motor, a pair of cutting wheels on opposite sides of the boom and responsive to a spindle motor and a controller which coordinates the operation of the first and second servo motors and the spindle motor to simultaneously cause the cutting wheels to trace and face the opposed ends of the pipes. The sled reciprocates along an X-axis in response to the first servo motor which drives the sled. The boom reciprocates along a Y-axis in response to the second servo motor which drives the boom. The cutting wheels are spaced-apart, parallel and vertically oriented. They rotate in unison on opposite sides of the boom about a common Z-axis in response to the spindle motor which drives the cutting wheels. The controller coordinates the operation of the first and second servo motors to cause the cutting wheel common Z-axis to trace the center of the thickness of the pipe end walls in a closed loop path. The controller simultaneously coordinates the operation of the spindle motor to simultaneously cause the cutting wheels to face the opposed ends of the pipes as the closed-loop path is traced.

BRIEF DESCRIPTION OF THE DRAWINGS

Other objects and advantages of the invention will become apparent upon reading the following detailed description and upon reference to the drawings in which:

FIG. 4 is a left elevation view of the pipe facer of FIG. 1;

FIG. 5 is a right elevation view of the pipe facer of FIG. 1;

FIG. 10 is a cutaway perspective view of the boom of the pipe facer of FIG. 1 showing the boom spindle and servo motor shafts;

FIG. 11 is a cutaway perspective view of the boom of the pipe facer of FIG. 1 showing the vertical lead nut;

FIG. 12 is a perspective view of the vertical lead block of the pipe facer of FIG. 1;

FIG. 15A is a perspective view of the pipe facer of FIG. 1 with the cutting wheels in a "start" position;

FIG. 15B is a perspective view of the pipe facer of FIG. 1 with the cutting wheels in a "12 o'clock" position;

FIG. 15C is a perspective view of the pipe facer of FIG. 1 with the cutting wheels in a "3 o'clock" position;

FIG. 15D is a perspective view of the pipe facer of FIG. 1 with the cutting wheels in a "6 o'clock" position;

FIG. 15E is a perspective view of the pipe facer of FIG. 1 with the cutting wheels in a "9 o'clock" position.

Figure 1:
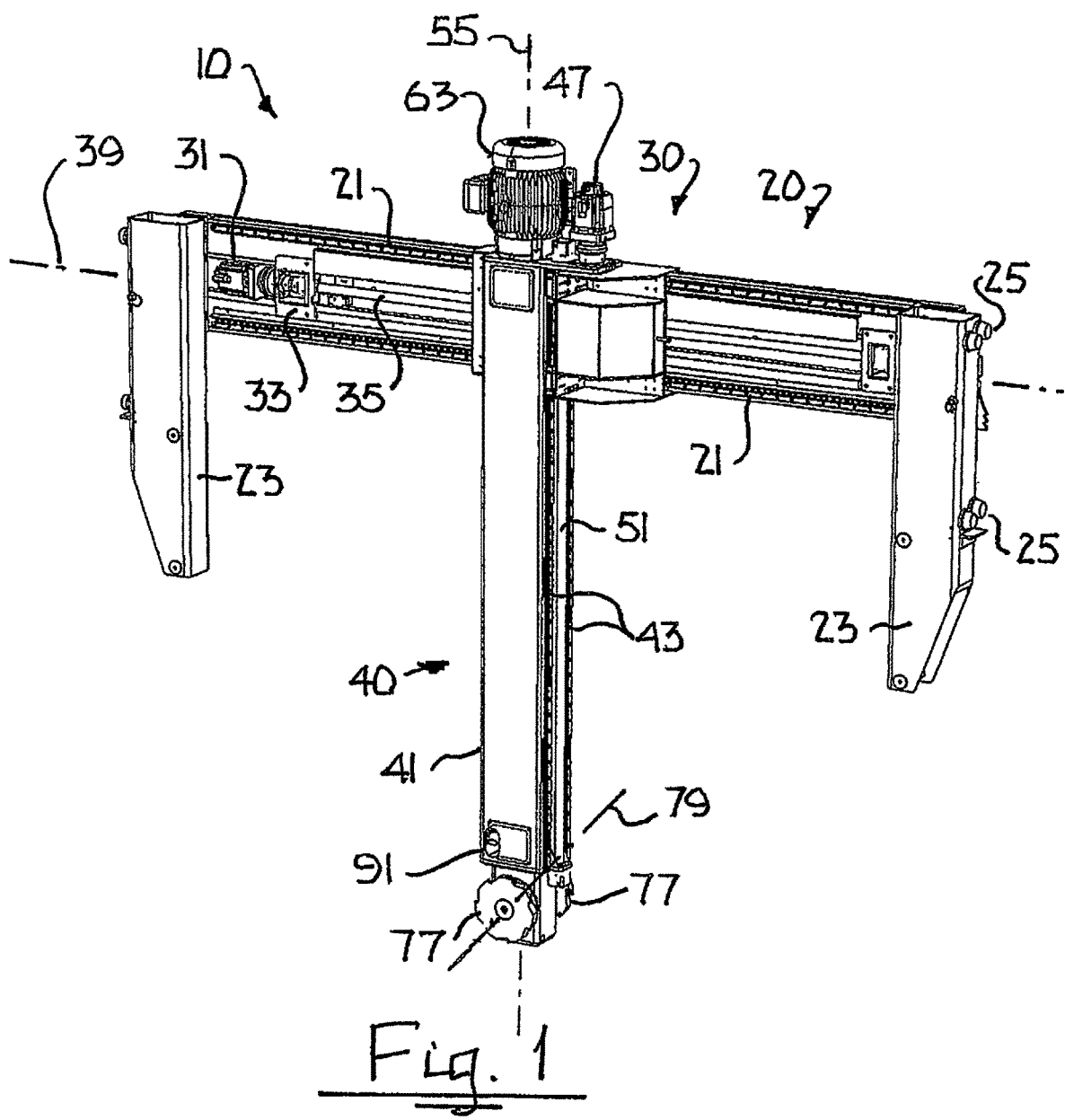
FIG. 1 is a perspective view of a pipe facer.
Figure 2:
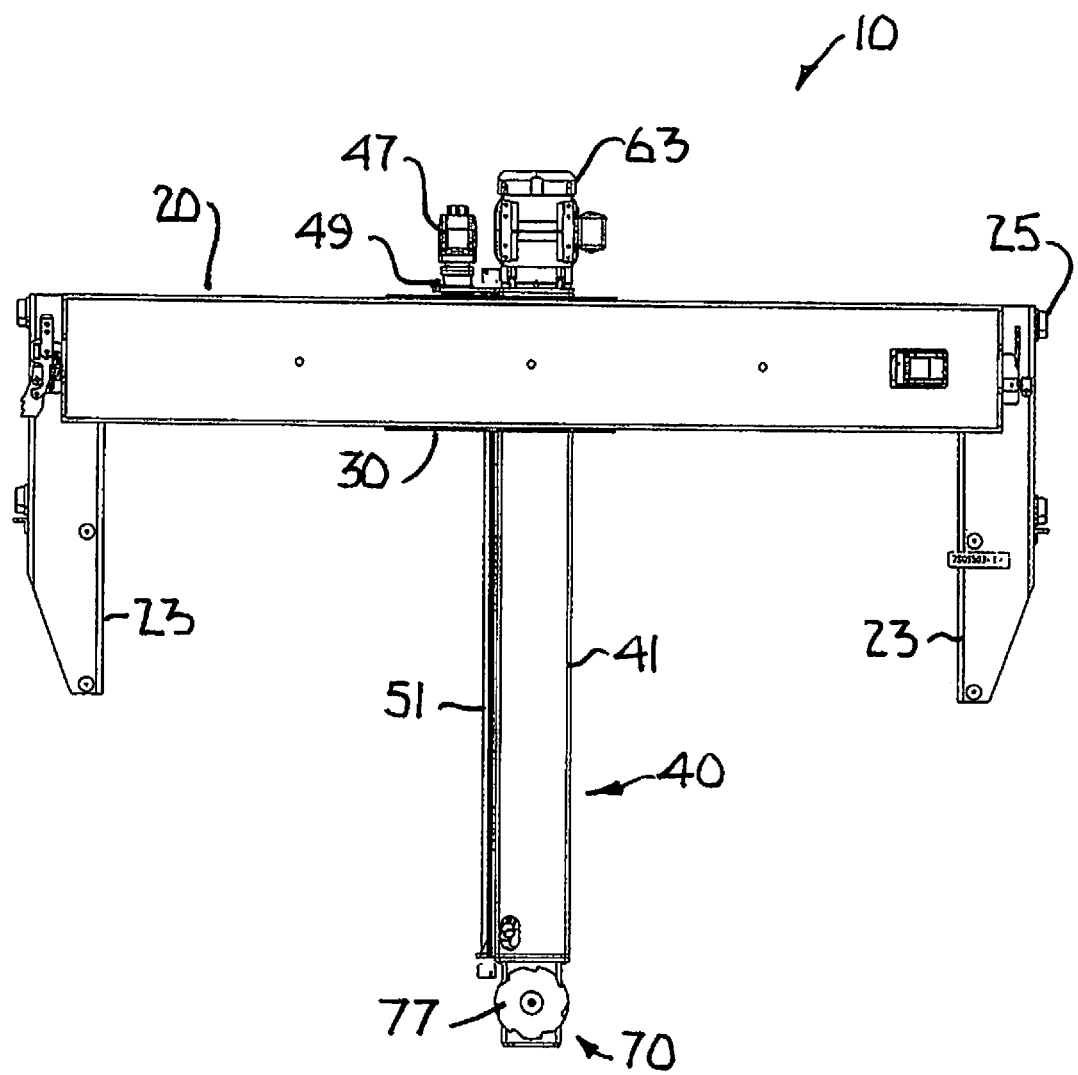
FIG. 2 is a front elevation view of the pipe facer of FIG. 1.

While the invention will be described in connection with a preferred embodiment thereof, it will be understood that it is not intended to limit the invention to that embodiment or to the details of the construction or arrangement of parts illustrated in the accompanying drawings.

DETAILED DESCRIPTION

Turning to FIGS. 1-7, a facer 10 for use in preparing the opposed ends of polyolefin pipes for fusion into a pipeline has a frame 20, a sled 30 mounted on the frame 10 and responsive to a first servo motor 31, a boom 40 mounted on the sled 30 and responsive to a second servo motor 47, a pair of cutting wheels 77 on opposite sides of the boom 40 and responsive to a spindle motor 63 and a controller 100 which coordinates the operation of the first and second servo motors 31 and 47 and the spindle motor 63 to simultaneously cause the cutting wheels 77 to trace and face the opposed ends T of the pipes.

The Frame

Figure 3:
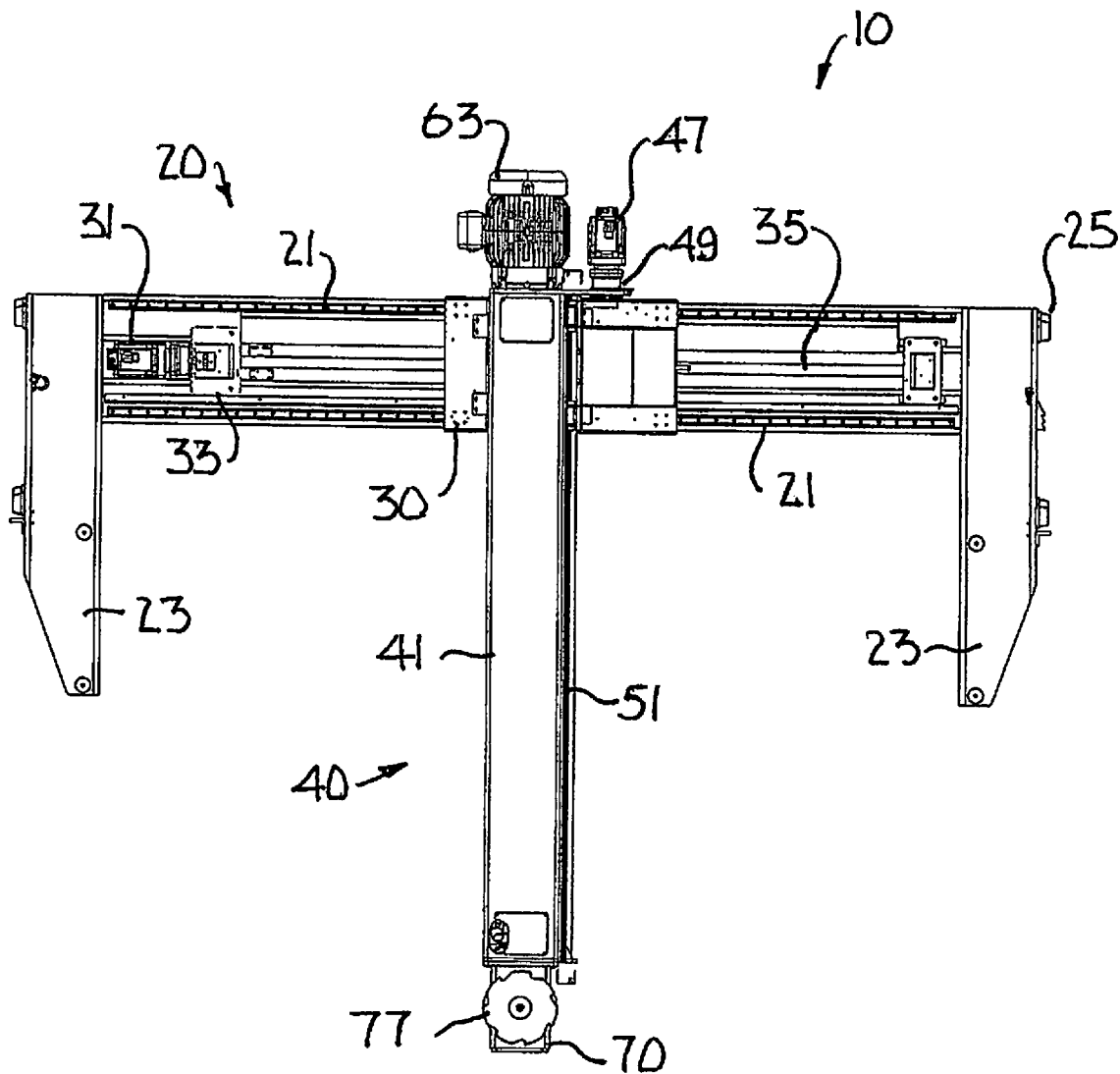
FIG. 3 is a rear elevation view of the pipe facer of FIG. 1.
Figure 6:
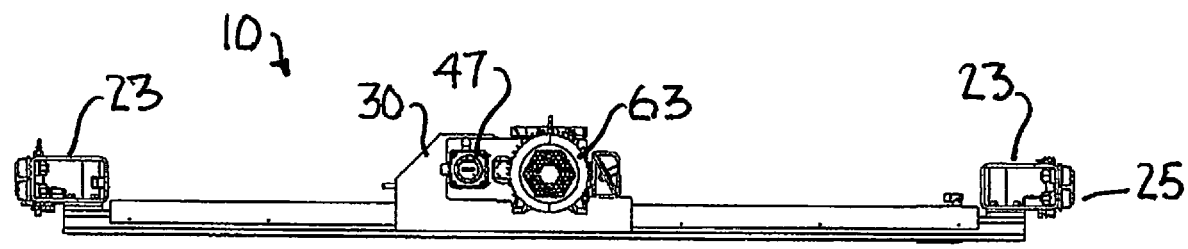
FIG. 6 is a top plan view of the pipe facer of FIG. 1.
Figure 7:
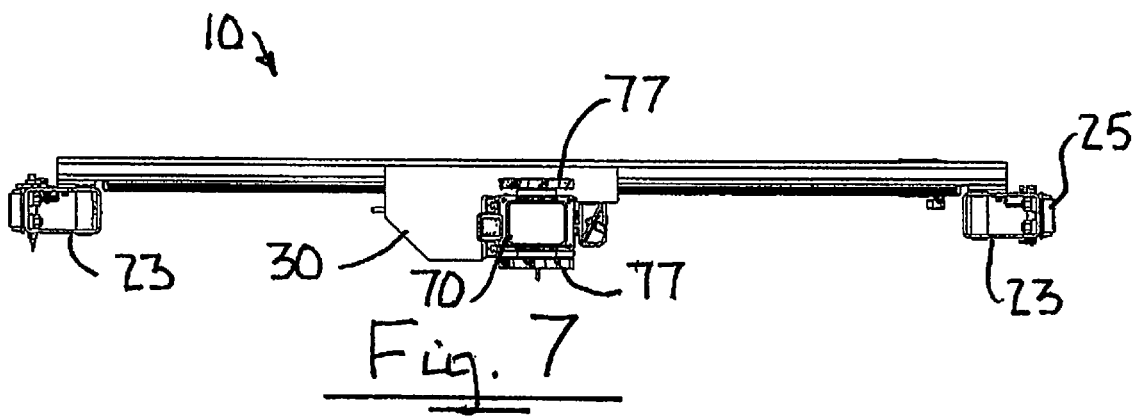
FIG. 7 is a bottom plan view of the pipe facer of FIG. 1.
Figure 8:
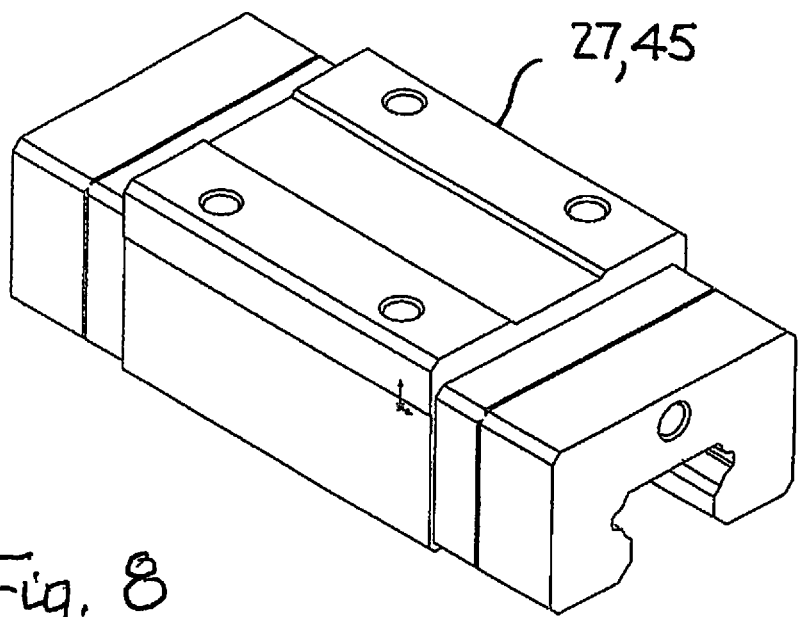
FIG. 8 is a perspective view of the carriages of the pipe facer of FIG. 1.

As best seen in FIG. 3, the facer frame 10 as horizontal rails 21 mounted between the upper ends of vertical posts 23. The vertical posts 23 are adapted for mounting the facer 10 on a stand and/or a fusion machine (not shown), for example by use of cam rollers 25 on the side walls of the posts 23 to engage on guides on the stand or fusion machine (not shown). The horizontal rails 21 act as horizontal linear guides which support the horizontal reciprocal motion of four horizontal carriages 27, seen in FIG. 8.

The Sled

Figure 9:
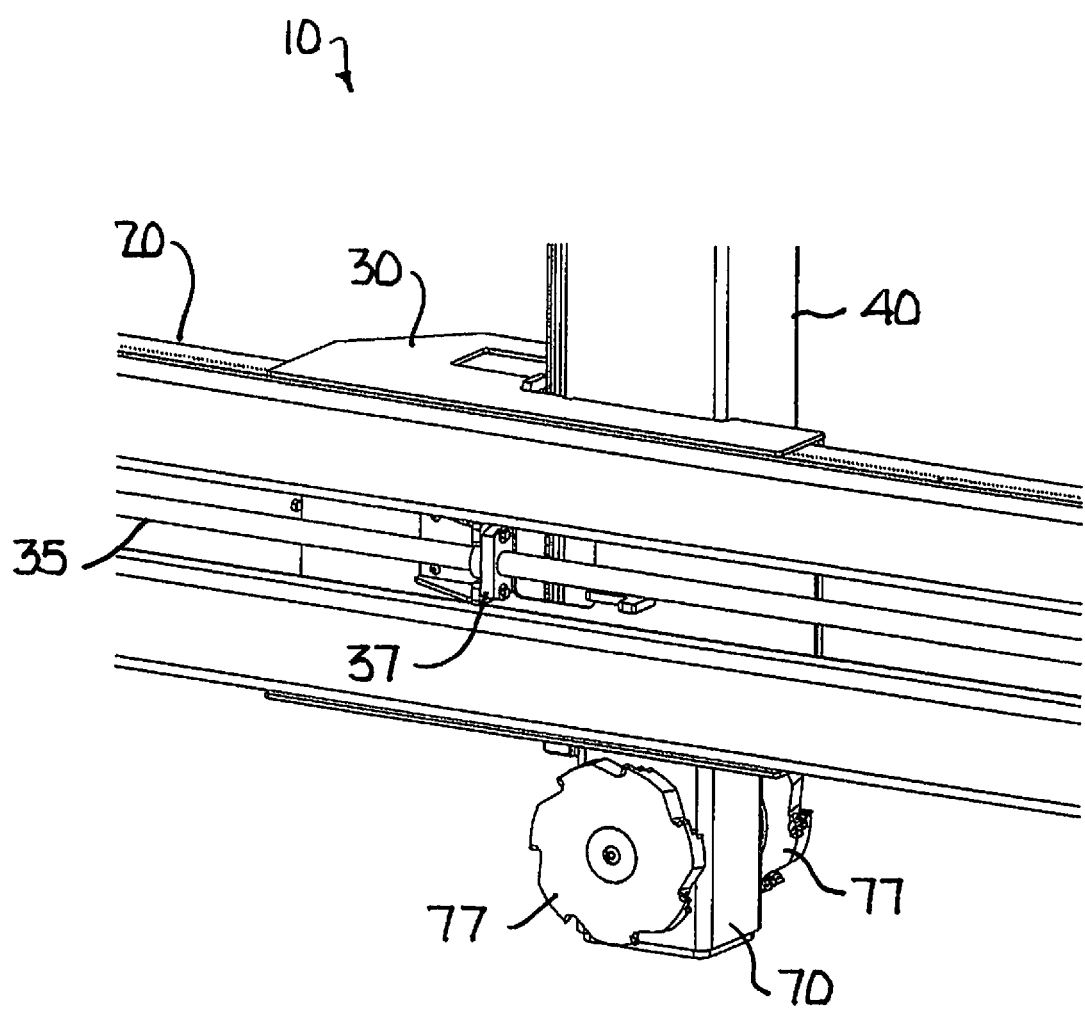
FIG. 9 is a cutaway perspective view of the frame and sled of the pipe facer of FIG. 1 showing the horizontal lead nut.

A horizontal servo motor 31 and horizontal servo gearbox 33 drive a horizontal lead screw 35 which extends between and parallel to the rails 21. As best seen in FIG. 9, a horizontal lead nut 37 is threaded on the horizontal lead screw 35. Continuing to Look at FIG. 9, the horizontal lead nut 37 is fixed to the sled 30. The sled 30 is mounted on, and reciprocates with, the horizontal carriages 27 along an X-axis 39 as the horizontal lead nut 37 advances or retreats in response to the rotation of the horizontal lead screw 35.

The Boom

Turning to FIGS. 10 and 11, the boom 40 is mounted on, and reciprocates horizontally with, the sled 30. The boom 40 has a vertical frame 41 with vertical rails 43 mounted between the upper and lower ends of the vertical frame 41. The vertical rails 43 act as vertical linear guides which support the vertical reciprocal motion of the boom 40 as they slide in four vertical carriages 45, seen in FIG. 8, on the sled 30.

Returning to FIGS. 10 and 11, a vertical servo motor 47 and vertical servo gearbox 49 drive a vertical lead screw 51 which extends between and parallel to the vertical rails 43 and engages a vertical lead nut 53, seen in FIG. 12. The vertical lead nut 53 sits between the vertical rails 43 and is threaded on the vertical lead screw 51. The vertical lead nut 53 is fixed to the sled 30. The boom 40 reciprocates together with its rails 43 in the vertical carriages 45 along a Y-axis 55 as the vertical lead screw 51 rotates in the vertical lead nut 53. As seen in FIG. 10, the vertical servo motor torque is transmitted to the vertical lead screw 51 by a timing belt 57 and two pulleys 59 mounted on a belt tension adjustment plate 61.

Continuing to look at FIG. 10, a spindle motor 63 is mounted on top of the boom 40. The spindle motor shaft 65 extends inside the boom 40, and transmits power from the spindle motor 63 to a coupling 67 in an arbor gear box 70 at the bottom of the shaft 65.

The Cutters

Figure 13:
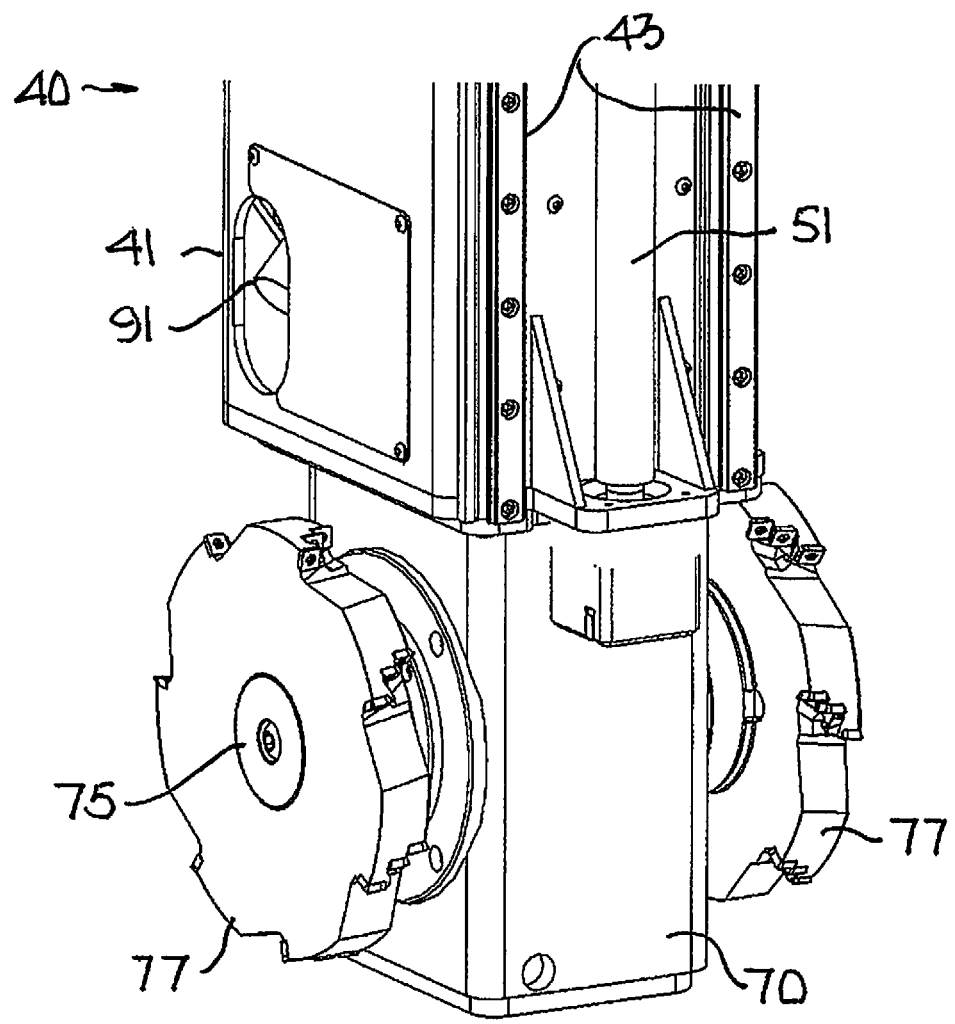
FIG. 13 is a cutaway perspective view of the arbor gear box of the pipe facer of FIG. 1.
Figure 14:
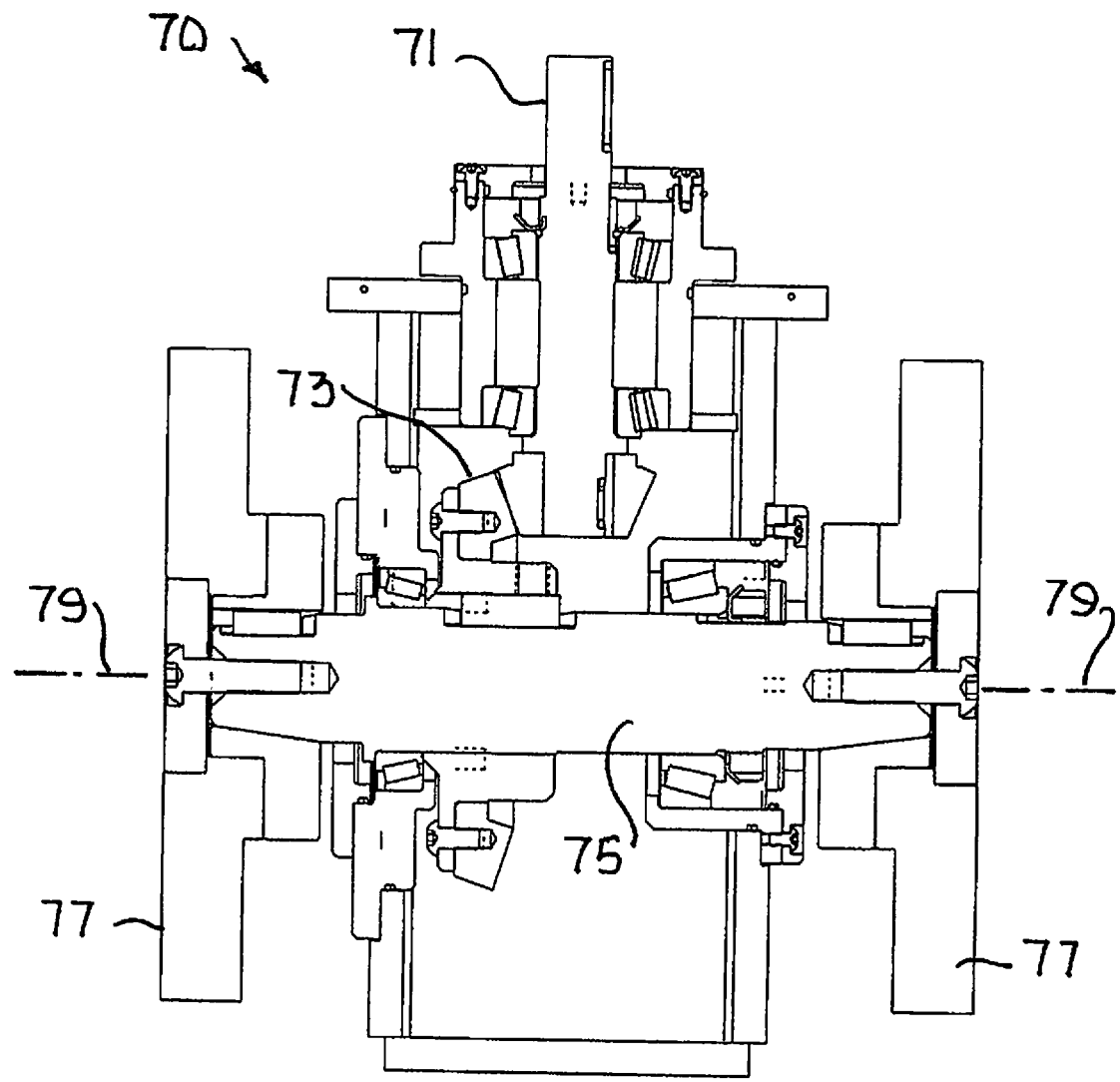
FIG. 14 is a cross-sectional view of the arbor gear box of the pipe facer of FIG. 1.

Turning to FIGS. 13 and 14, the arbor gear box coupling 67 transmits power from the boom shaft 65 to a vertical pinion shaft 71. A gear train 73 transfers the power from the vertical pinion shaft 71 to a horizontal arbor shaft 75. A pair of spaced-apart, axially aligned vertically oriented cutting wheels 77 rotates in unison, one on each end of the arbor shaft 75, about a common Z-axis 79. The cutting wheels 77 rotate in the same direction and cut in the same direction in response to the spindle motor 63 driving the pair of cutting wheels 77. In some applications, it may be desirable that the cutting wheels 77 counter-rotate. This may be accomplished, for example, by modification of the gear train 73.

The System Electrical System and Operation

As seen in FIGS. 15A-15E, the system controller 100 coordinates the operation of the first and second servo motors 31 and 47 to cause the cutting wheel common Z-axis 79 to trace the center of the thickness T of the pipe end walls in a closed loop path. In FIG. 15A, the cutting wheels 77 are at a start position 81 within the circumference of the pipes. In the facing process, they advance to the 12 o'clock position 83 shown in FIG. 15B and proceed, as shown but not necessarily, clockwise along the pipe faces T. FIGS. 15B, 15C, 15D and 15E sequentially illustrate the extreme 12, 3, 6, and 9 o'clock positions 83, 85, 87 and 89 of the cutting wheels 77, respectively, 12 and 6 o'clock being the highest and lowest positions of the boom 40 and 3 and 9 o'clock being closest and furthest positions of the sled 30 during facing. The controller 80 coordinates the operation of the spindle motor 63 to simultaneously cause the cutting wheels 77 to face the opposed ends T of the pipes as the closed-loop path from 12 o'clock to 12 o'clock is traced.

Figure 16:
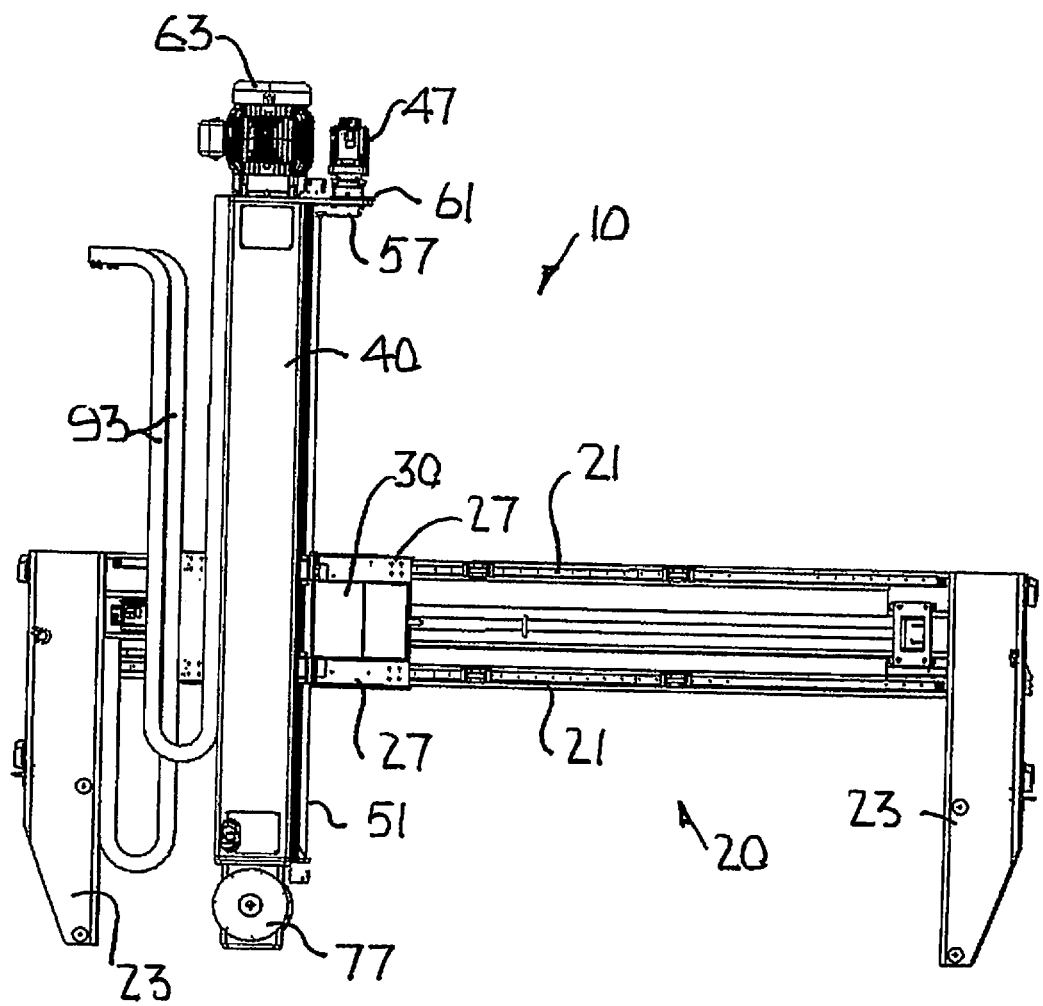
FIG. 16 is a cutaway perspective view of the cable connections of the pipe facer of FIG. 1.

As seen in FIG. 13, cameras 91 mounted on the boom 40 above the cutting wheels 77 inspect the faced surfaces T of the pipes after 360° rotation of the cutting wheel assembly along the cross section T of the pipes to be fused. As seen in FIG. 16, energy chains 93 manage movement of the facer cables during the facing process.

Figure 17:
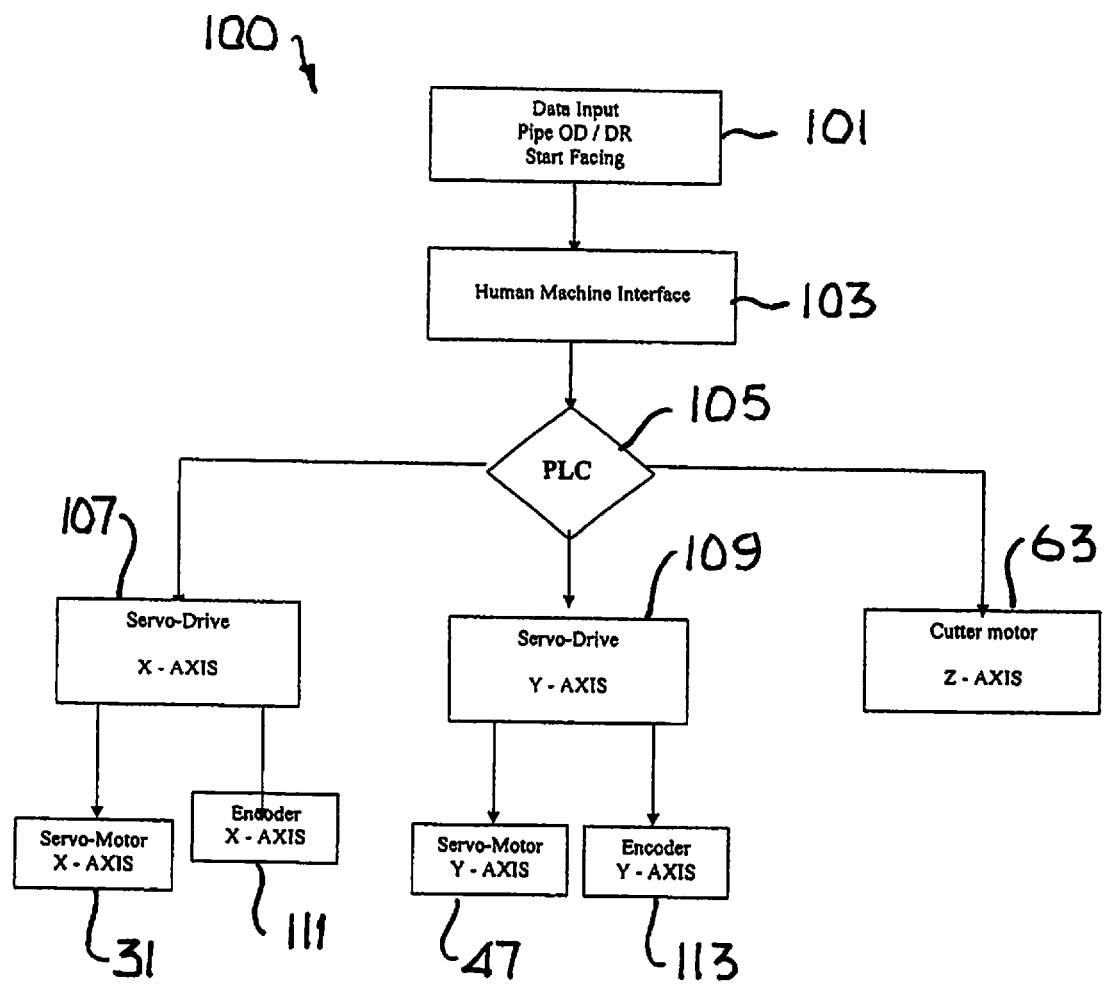
FIG. 17 is an electrical block diagram of the pipe facer of FIG. 1.

Turning to FIG. 17, data input 101 by the operator, including the pipe outer diameter (OD) and dimension ratio (DR), is received via a human machine interface (HMI) 103 by a programmable logic controller (PLC) 105. The HMI 103 provides a graphical interface for the operator and communicates via PROFINET to the PLC 105. The PLC 105 is the central process unit (CPU) of the facer 10 and contains the facer operating program. The PLC 105 commands the spindle motor 63 and the servo drives 107 and 109 for the X and Y axes 39 and 55. The servo drives 107 and 109 control the servo motors 31 and 47, which are the prime movers for the X and Y axes 39 and 55, in response to an encoder's feedback and communicate via PROFINET to the PLC 105. The encoders 111 and 113 provide positioning feedback to the servo drives 107 and 109 and communicate via PROFINET to the PLC 105. The spindle motor 63 is the prime mover for the facer cutting wheels 77 and is controlled by the CPU through digital output.

In operation, the operator enters the pipe OD and DR on the HMI 103. The data is stored in the CPU and used to calculate the parameters required for the facing process. When the start facing button on the HMI 103 is pressed, the CPU executes the facing process by sending the required data every 150 ms to the servo drives 107 and 109 which control the servo motors 31 and 47 based on their encoder feedback. The CPU also monitors and validates the data and, if there is any discrepancy, the process is aborted and a fault message is displayed on the HMI 103.

Thus, it is apparent that there has been provided, in accordance with the invention, a cartesian pipe facer that fully satisfies the objects, aims and advantages set forth above. While the invention has been described in conjunction with a specific embodiment thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For preparing opposed ends of polyolefin pipes for fusion into a pipeline, a facer comprising a pair of spaced-apart parallel vertically oriented cutting wheels on opposite sides of a boom and rotatable in unison about a common axis extending through a free end of said boom and a motor driving said pair of cutting wheels about said common axis, said boom being configured to enable said common axis to trace a thickness of the opposed ends of the polyolefin pipes in a closed-loop path whereby said pair of parallel cutting wheels will simultaneously face the opposed ends of the polyolefin pipes.

2. For preparing opposed ends of polyolefin pipes for fusion into a pipeline, a facer comprising a pair of spaced-apart parallel vertically oriented cutting wheels on opposite sides of a boom and rotatable in unison about a common axis extending through a free end of said boom and a motor driving said pair of cutting wheels about said common axis, a length and a width of said boom and a distance between said pair of parallel cutting wheels being coordinated to enable said common axis to trace a thickness of the opposed ends of the polyolefin pipes in a closed-loop path whereby said pair of parallel cutting wheels will simultaneously face the opposed ends of the polyolefin pipes.

* * * * *